Oct. 5, 1954 J. RABINOW 2,690,913

MAGNETIC MEMORY DEVICE

Filed March 14, 1951 5 Sheets-Sheet 1

INVENTOR.

JACOB RABINOW

BY

G. J. Kessenich + A. W. Dew

ATTORNEYS

Oct. 5, 1954 J. RABINOW 2,690,913

MAGNETIC MEMORY DEVICE

Filed March 14, 1951 5 Sheets-Sheet 2

INVENTOR.
JACOB RABINOW
BY
G. J. Kessenich & A. W. Dew
ATTORNEYS

INVENTOR.
JACOB RABINOW
BY
G. J. Kessenich & A. W. Dew
ATTORNEYS

Oct. 5, 1954 J. RABINOW 2,690,913

MAGNETIC MEMORY DEVICE

Filed March 14, 1951 5 Sheets-Sheet 4

Inventor

JACOB RABINOW

By G. J. Kessenich + A. W. Dew

Attorneys

Oct. 5, 1954 J. RABINOW 2,690,913

MAGNETIC MEMORY DEVICE

Filed March 14, 1951 5 Sheets-Sheet 5

Inventor

JACOB RABINOW

By G. J. Kessenich + A. W. Dew

Attorneys

Patented Oct. 5, 1954

2,690,913

UNITED STATES PATENT OFFICE 2,690,913

MAGNETIC MEMORY DEVICE

Jacob Rabinow, Takoma Park, Md., assignor to the United States of America as represented by the Secretary of the Army Application March 14, 1951, Serial No. 215,616

11 Claims. (Cl. 274—10)

(Granted under Title 35, U. S. Code (1952), sec. 266)

The invention described in the specification and claims may be manufactured and used by or for the Government for governmental purposes without the payment to me of any royalty thereon.

This invention relates generally to new and useful improvements in recording and reproducing machines.

In the field of electronic digital computers and in work where voluminous records must be kept, it is important and desirable that vast quantities of data or information be stored in such a way that any specific part thereof may be quickly reached for reading or reference.

It is well known that coded and other forms of information can be stored on a magnetizable medium in the form of local "spots" provided that the medium possesses appreciable magnetic retentivity. My invention contemplates in its preferred form the use of magnetic surfaced discs so arranged that several thousand of them may be readily available for use in recording or reproducing information. It is a broad object of my invention to provide a novel recording and reproducing machine in which a plurality of records or discs can be stored and any one of them used at will.

The methods used by Government and business for keeping records have, in recent years, become of greater and greater importance. In industry the physical handling of goods has been mechanized to a very high degree while the handling of information has lagged behind. As the tempo of business operations increases it has been generally recognized that to maintain efficiency the handling of business data must be speeded up or the point of diminishing returns in the growth of the size of business enterprises may be reached sooner than would otherwise be the case. One of the preliminary functions of Government is, of course, the keeping of voluminous records particularly in such functions as the keeping of the census, social security, military personnel and inventory, weather bureau, Government control of prices and wages, allocations, etc.

It is important to point out that records are not made for the sake of history but must be made in a form which is readily available so that decisions for action can be intelligently based on the information contained in them. This means that the records must be both complete and readily available. Because of the volume of information which is involved in the above operations, three dimensional storage is indicated. By three dimensional storage is meant methods of recording data which is then packed in solid form. Information can also be stored in a single dimension or in two dimensions and may be packed in two or three dimensions. For instance, storage of magnetic pulses on a wire is essentially of single dimension unless the wire is rolled up into a reel when it becomes three dimensional, but the access is still along a single dimension and the reel must be played out in order to reach a particular bit of data. Magnetic discs are frequently employed. This is essentially two dimensional recording and two dimensional storage. Recording on magnetic tapes is two dimensional while the storage is three dimensional. Tapes suffer from the same disadvantage of low access time as do wires.

My invention contemplates the use of disc recordings which are two dimensional but which are stacked in three dimensional arrays and which can be "played" without being moved from their stored position. An ordinary printed book is of the same type of recording machine except that the pages must be opened in order to be read. My invention results in a "book" in which the pages can be read without the book being opened.

By using magnetic discs, various types of information can be stored including, if necessary, the recording of ordinary voice sounds. Because of the rapid access possible, this device should find uses in fields heretofore unmechanized. For instance, it should be possible to record the telephone numbers of all the subscribers of a large city on one machine and have the machine operated directly by the person who is looking for information. The machine should be capable of keeping up with the dialing of a number and should be able to read back to this person the telephone number of any subscriber. The method of operation of such machine would become obvious after a study of the following specifications:

It is another object of my invention to provide an improved means for storing magnetic records and controlling the shifting action of the recording head whereby a record may be selected.

It is a further object of my invention to provide a recording and reproducing means which is relatively simple but of durable character and which is compact and relatively inexpensive to make.

Other objects and advantages of my invention will be understood by reference to the following specification and accompanying drawing wherein there is illustrated a recording and reproducing means embodying a selected form of the invention.

Figure 1:
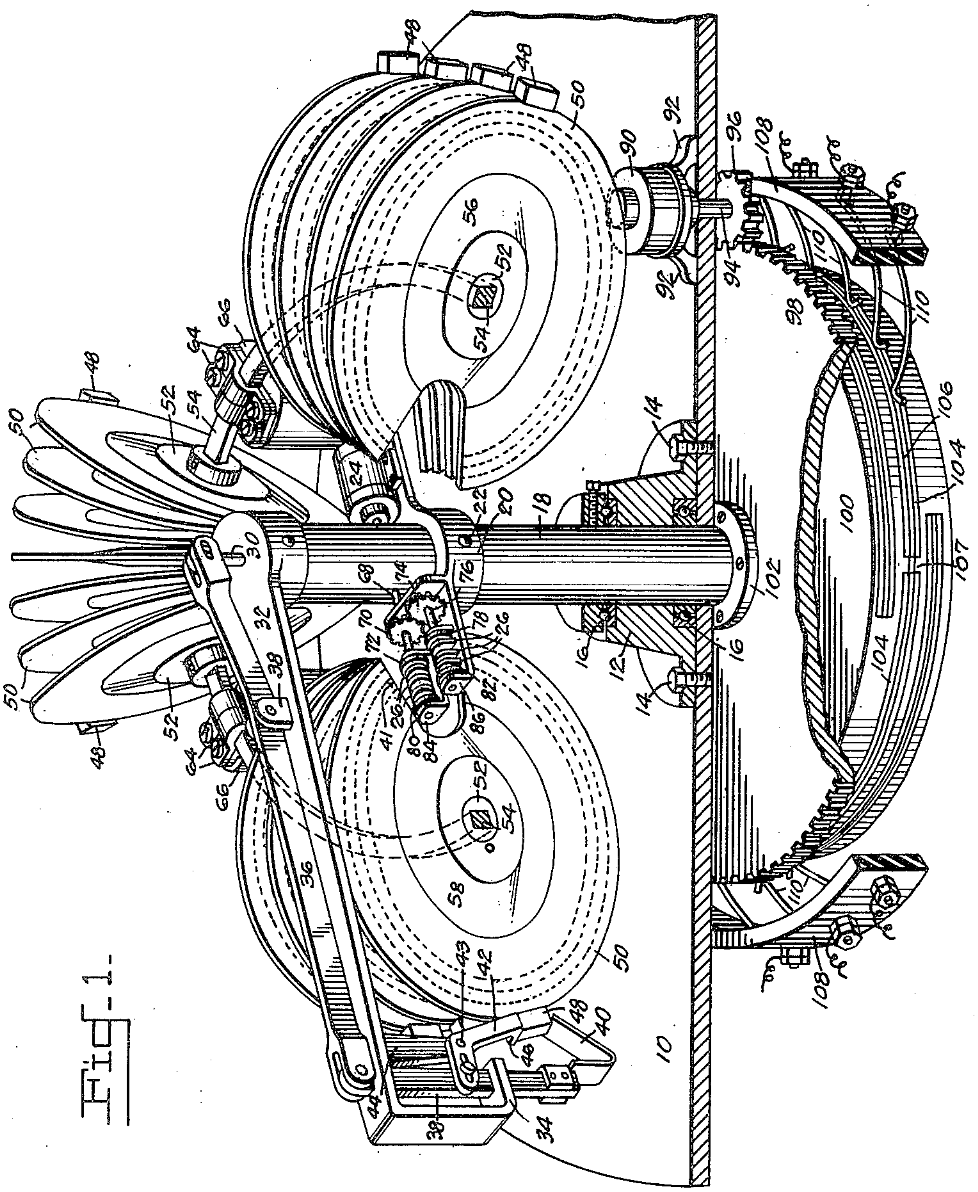
Figure 1 is a perspective view with portions cut away of a preferred form of my invention.
Figure 2:
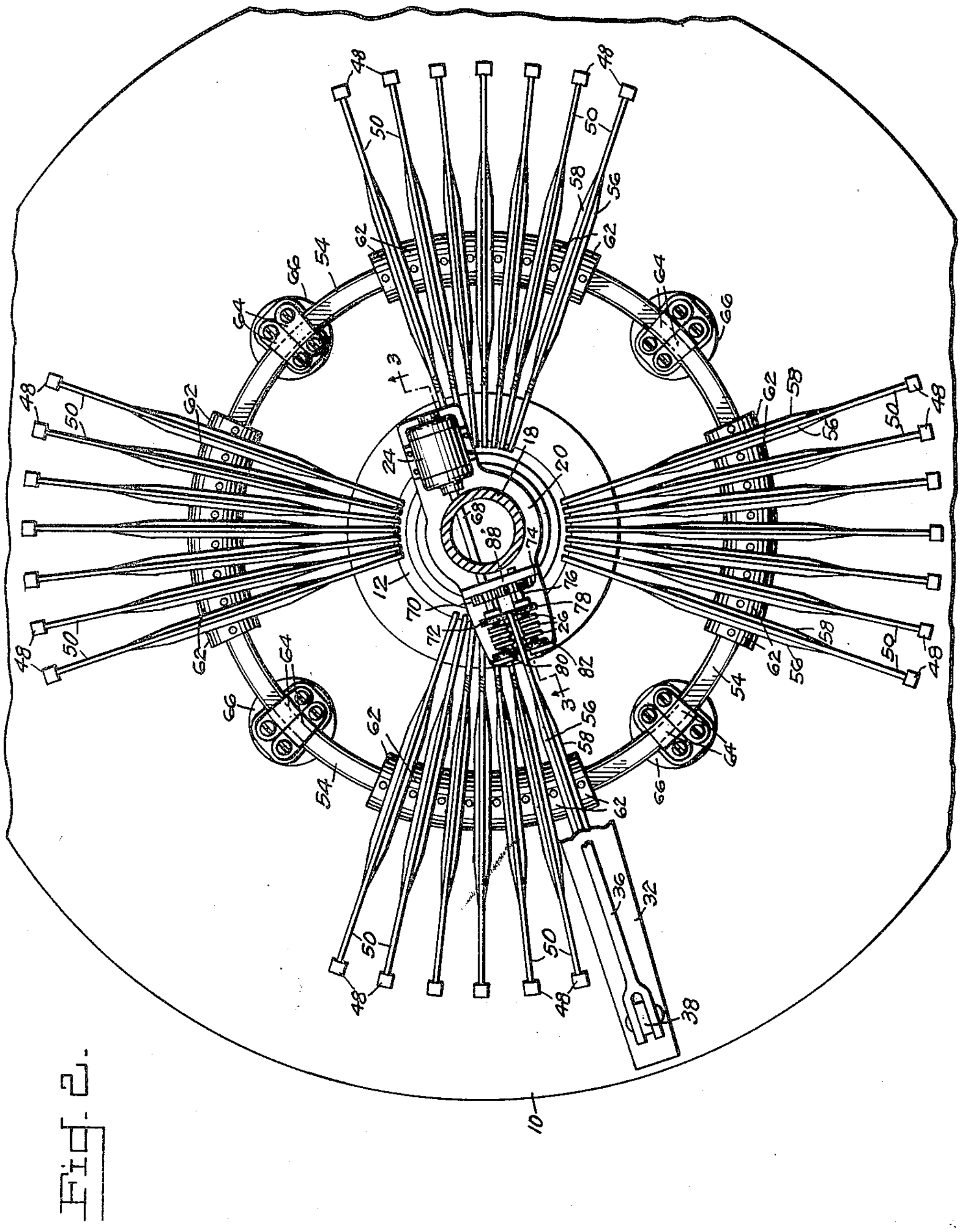
Figure 2 is a plan view of the invention.

Referring now to the drawings wherein like reference numerals designate like parts, the improved recording and reproducing structure includes framework 10 which is provided with a boss 12 that serves to guide and support shaft 18 which carries the record initiating means above the framework 10 and carries the indexing of selecting mechanism below the framework as will later appear.

Figure 3:
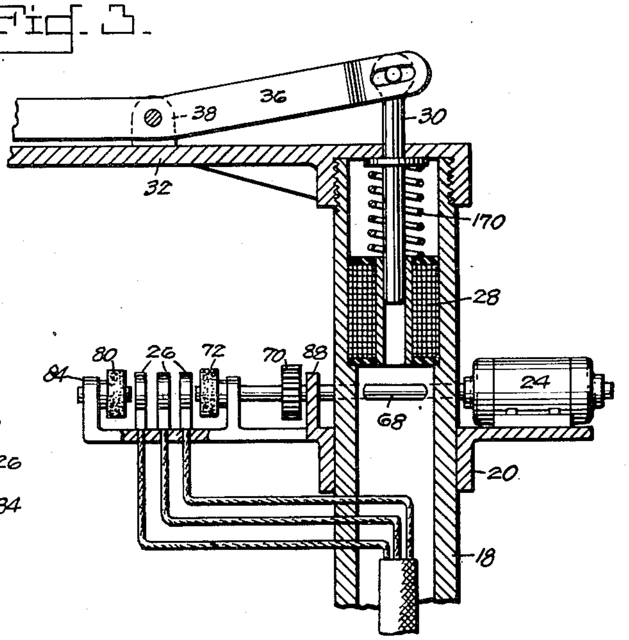
Figure 3 is a cross section taken on lines 3—3 of Figure 2.

Disposed at substantially a right angle to supporting shaft 18 is bracket member 20 which encircles the shaft and is secured thereto in fixed position by screw 22 and has opposed supporting platforms, the first of which receives recording motor 24 and the second receiving the recording heads 26 and their associated apparatus. The various necessary leads and wires for supplying energy to the motor 24 and for transmitting intelligence are carried within shaft 18 (best seen in Figure 3). Also contained within the shaft is solenoid 28 and plunger 30 which are for a purpose to be explained.

Arm 32 is substantially flat and terminates at one end with a threaded cap which receives the shaft 18 and at the other end is bent back upon itself into a plane parallel to the plane of the arm forming a hook 34. Bell crank 36 is carried upon arm 32 and is pivotally received by lugs 38 raised from the upper surface of the arm. Both ends of the bell crank 36 are bifurcated, one receiving in pivoted engagement plunger 30 previously referred to and the other end receiving actuating rod 38 which passes downward through holes piercing the rod and hook portion thereof as shown in Figure 1. Actuating rod 38 terminates in a spring hook 40 and has pivotally secured thereto midway of its length one leg of bell crank 42 which is further pivoted near its center from boss 44 depending from arm 32. The other leg of bell crank 42 terminates in a foot 46, which normally rests against the upper side of lug 48 which is secured to or made integral with disc 50.

The discs 50, which receive and store some intelligence for future use, comprise relatively thin flat plates having a portion or segment thereof removed or broken away sufficient to clear bracket member 20 and its associated appurtenances when the same rotates as will appear later. The broken-away portion of the disc has divergent virtually straight sides and an arcuate base of sufficient radius to join the said sides and is approximately in the shape of a hyperbola. It will be understood that the shape and size of the broken-away portion is not critical. Lugs 48 are secured to or made integral with the discs 50 at a point on the outer periphery thereof opposite to the centerline of the broken-away portion as can be seen in Figure 1.

In the preferred form of my invention the discs are the magnetic surfaced type which are well known to those versed in the art. Intelligence is received and stored thereon in the well known method of recording magnetic pulses. It will be understood however that my invention contemplates the use of any known type of disc or record whatsoever including the engraved groove commercial record.

Figure 6:
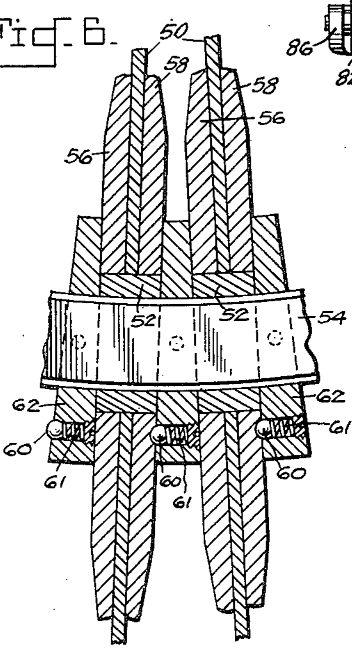
Figure 6 is an enlarged section view of a portion of the magnetic record.
Figure 7:
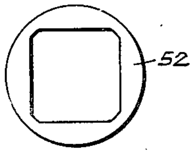
Figure 7 is an enlarged detail view of a record securing hub.

The disc has a centerhole therethrough which receives hub 52 best shown in Figures 6 and 7. Hub 52 is properly bored to embrace arcuate supporting bar 54 which is square in cross section so that the hub cannot turn. Spacers 56 and 58 are joined to the disc one on each side thereof by welding or other suitable means (not shown) so that the three members 50, 56 and 58 form a unitary structure for rotation together. Spacer 58 has a hole therein to receive a detent ball 60 contained within and spring urged from bushing 62. The bushings 62 are wedge shaped with their points directed inwardly so that the discs which are placed therebetween assume the position of a plurality of spokes radiating outwardly from shaft 18 as a center. Bushings 62 have a square bored centerhole and embrace arcuate supporting rod 54 so that there is no relative motion therebetween.

Arcuate disc supporting rods 54 are joined in abutting relationship by straps 64 to supporting posts 66 whereby a complete circle is formed so that any of the discs can be removed and discarded or additional discs assembled at will.

Figure 5:
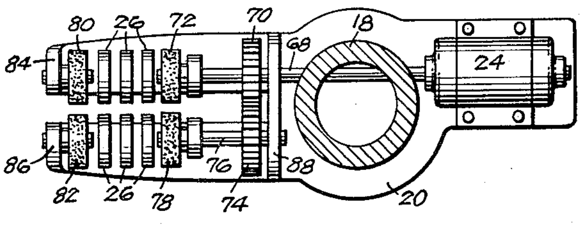
Figure 5 is an enlarged plan view of the recording and reproducing heads and their associated mechanism.

Bracket member 20 supports on one side thereof motor 24 which is energized from any suitable source of voltage through leads (not shown) passing within shaft 18. Motor 24 drives spindle 68 passing through shaft 18 (best shown in Figure 5). Keyed or otherwise secured to spindle 68 and rotating therewith are gear 70 and soft rubber roller 72. Gear 74 meshes with and is driven from gear 72 and has secured thereto spindle 76 which drives soft rubber roller 78. The motor is so connected that roller 72 rotates in a counterclockwise direction and roller 78 rotates in a clockwise direction when viewed from the gear side, for a purpose to be presently explained. Magnetic recording heads 26 are suitably mounted for recording information on and reproducing information from the disc. Three heads are here shown but it will be understood that any number may be provided for selecting or recording information at any point on the radius of the disc. This is especially important since the heads are not per se movable but will wipe against the disc at only one selected radius from the center thereof. Idler rollers 80 and 82 are supported on stub shafts mounted in upturned ears 84 and 86. It will be noted in Figure 5 that the structure to the left of lip 88 is symmetrical about a line passing through the point of mesh of engagement of gears 70 and 74.

Figure 8:
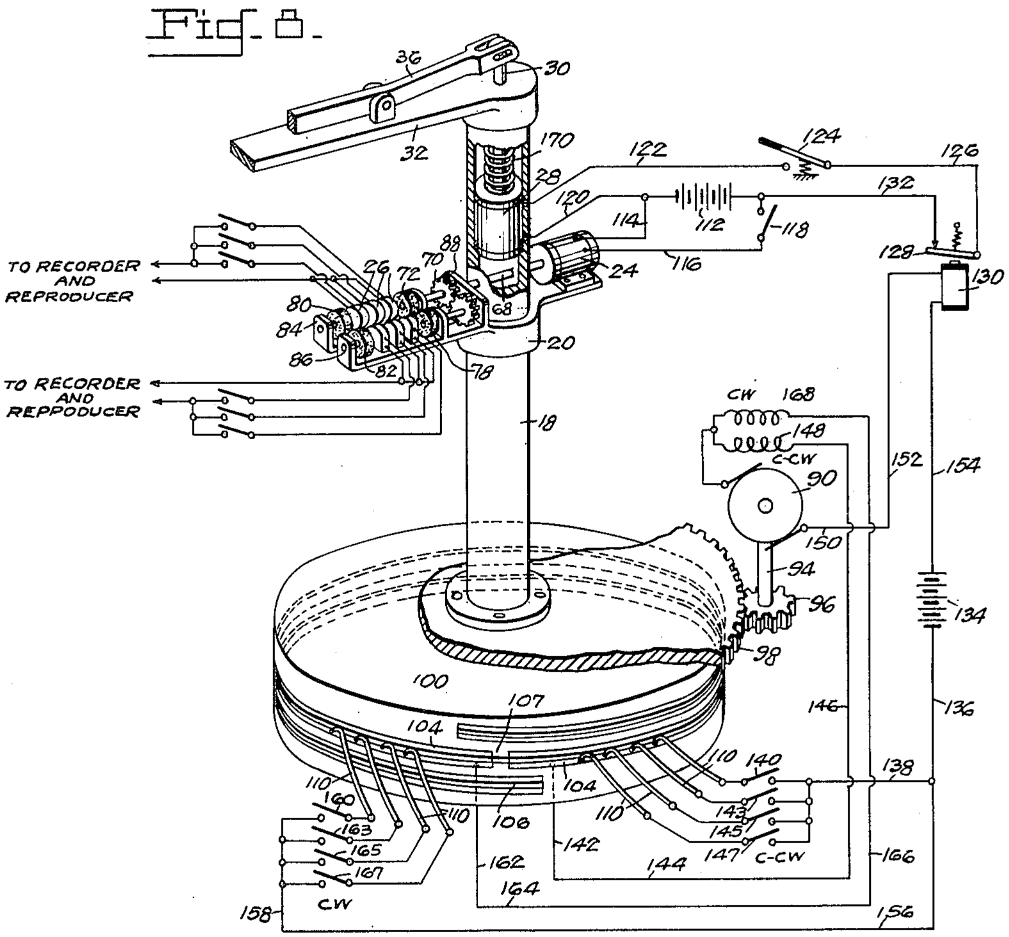
Figure 8 is a perspective view with portions broken away together with a schematic wiring diagram of the electrical circuit.
Figure 9:
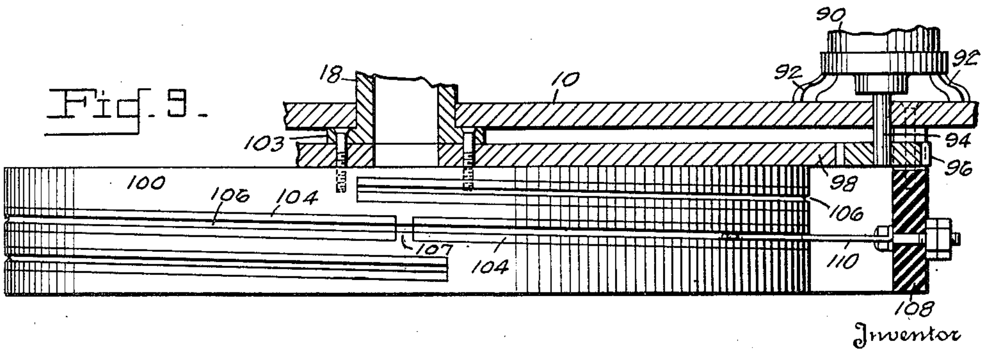
Figure 9 is an enlarged section view of the positioning mechanism.

The disc selecting or indexing mechanism consists of a vertical driving motor 90 mounted on framework 10 by legs 92 and having its shaft 94 extending downward through the framework and keyed or otherwise secured to pinion 96 which drives spur gear wheel 98. Supporting shaft 18 spur gear wheel 98 and plate 100 are fastened together by screws passing through shaft flange 102 and piercing spur gear wheel 98. Plate 100 carries on its outer periphery a helically wound strip or band 104 of copper or other metal of good conductivity and having a slot or grooved recess 106 on the centerline to receive sliding contactors (best shown in Figure 9). The strip 104 extends slightly more than two complete turns around the outer plate periphery and is broken or separated a suitable distance 107 for a purpose to be explained. Surrounding plate 100, coaxial therewith, and spaced a suitable distance therefrom is annulus 108 made of plastic or other insulating material. Secured to the annulus by bolts are fingers 110 which are of flexible construction and are bent back at their ends and serve as sliding contactors for the passage of electrical energy from surface to surface which have relative motion therebetween. Figure 8 shows the wiring diagram of my improved recording and reproducing mechanism. Battery 112 which is in symbolic form only and may be any suitable source of voltage, supplies energy to motor 24 through lead 114 through the motor coils through lead 116, switch 118 and back to the source. Solenoid 28 is supplied in parallel with the motor and the circuit is traced through lead 120, through the solenoid, lead 122 switch 124 lead 126, armature 128 of relay 130 and lead 132 back to the source. Battery 134 which may be any source of voltage supplies energy for relay 130 and reversable motor 90. The circuit is traced for counterclockwise rotation from battery 134 through lead 136, lead 138, whichever of the selector switches CCW that may be closed, through the associated contact finger 110 through the strip 104, lead 142, lead 144, lead 146, motor field 148, motor armature 90, lead 150, lead 152, solenoid coil 130 and lead 154 back to the battery. For clockwise rotation the circuit is traced from the battery, lead 136, lead 156, lead 158, through whichever switch CW may be closed, through the associated contact finger 110, through strip 104, lead 162 lead 164 lead 166 through motor field 168, motor armature 90, lead 150, lead 152, solenoid coil 130 and lead 154 back to the battery. Manually operated switches 140, 143, 145, 147 and 160, 163, 165 and 167 are used for selecting at the will of the operator the particular recording and reproducing head. It will be understood that any suitable automatic or remote control means such as a relay may be used to replace the switches shown.

*Operation*

Figure 4:
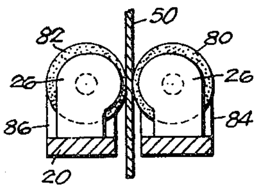
Figure 4 is an enlarged elevation view of the recording and reproducing heads used in my invention.

The operation of the preferred form of the invention above described is as follows: Assuming that there is intelligence recorded on one of the discs in the form of a magnetized spot. With switch 118 closed motor 24 is running. If switch 124 be closed by any suitable means, by hand, or in response to an impulse from an electronic computer or the like, then solenoid 28 is momentarily energized and plunger 30 is drawn down against the action of spring 170. When plunger 20 is drawn down bell crank 36 is pivoted and rod 38 carrying spring hook 40 rises and strikes against lug 48 of whatever disc may be under arm 32. As rod 38 rises bell crank 42 is pivoted at 43 and shoe 46 is withdrawn from the path of movement of lug 48 and the leading edge 41 of the broken-away portion of the disc is rotated within the soft rubber rollers (Figure 4) which are rotating toward each other as previously explained. The disc will rotate rapidly between the heads and the intelligence will be transmitted to the receiving organization. The energization of solenoid 28 is momentary only but sufficient impetus is given the disc to cause it to rotate completely around if the soft rubber rollers were not provided to guide and move the same. Upon deenergization of the solenoid, spring 170 urges plunger 30 upward which rocks bell crank 36 to its former position, lowering rod 38 and rotating bell crank 42 so that shoe 46 stands in the path of lug 48. As the disc turns, the lugs 48 is able to pass resilient spring hook 40 and comes to rest when it abutts against shoe 46. In this position spring 61 (Figure 6) snaps detent ball 60 into its cavity. It will be understood that the disc rotates at high speed under the urging of the driving rollers. The passage of lug 48 past resilient hook 40, which occurs when the broken away portion of the disk passes between the rollers, dissipates some of the kinetic energy of rotation of the disc and the disc comes to a complete stop when lug 48 strikes shoe 46 as previously expained. In this position the broken-away portion of the discs are so set with respect to bracket 20 that the bracket may sweep a complete horizontal circle within the same.

If it now be desired to select another disc, one of the groups of selector switches (CW or CCW) closed manually or by any well known automatic means. For example if switch 160 be thrown, current will flow from the battery 134 through lead 136, lead 156, switch 160, contactor 110, strip 104, to lead 162, lead 164, lead 166, field winding 168, armature 90, through solenoid coil 130 and back to battery through lead 154. The solenoid 130 will be energized thus opening the circuit to solenoid 28 and preventing the actuation thereof if any pulses be received to close switch 124 during the disc selection cycle. Motor 90 is now energized and will drive spur gear 96, wheel 98, and plate 100, and shaft 18 carrying the heads until spring contact 110 rides off strip 104 at break or separation 107 and opens the circuit. Motor 90 will stop, the arm 32 having been turned to the position of the selected record and solenoid coil 130 is now deenergized. Armature 128 is spring urged to its normal position and the newly selected disc will be brought into playing engagement when switch 124 is closed by external means.

Figures 10, 11, 12:
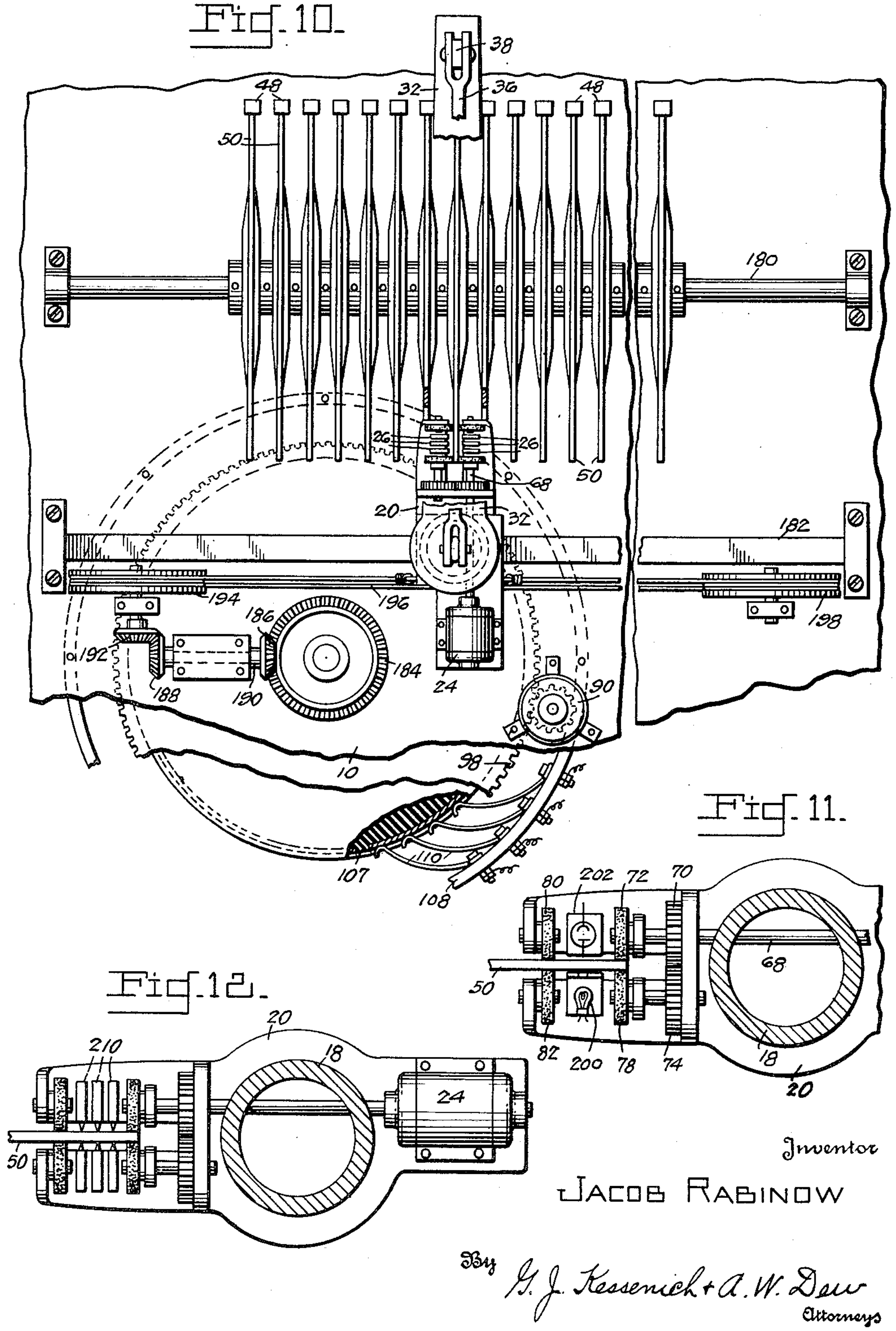
Figure 10 is a plan view of a modification of my invention.
Fig. 11 is an enlarged view of a modification of the recording and reproducing head.
Fig. 12 is an enlarged view of a further modification of the recording and reproducing head.

Another modification of my invention is shown in Figure 10. Here the discs which are of exactly the same construction as in the former modification are arranged in line upon a shaft 180. Bracket member 20 carrying motor 24 and heads 26 is mounted on a supporting shaft (not shown) which is in turn slidably mounted on rail 182.

As in the preferred embodiment, the shaft terminates in bell crank carrying arm 32. The disc indexing or positioning structure is the same as in the preferred form except that in lieu of a direct flanged connection a geared-belt drive is provided to change rotary motion into motion is a straight line. Ring gear 184 is mounted on gear wheel 98, bevel gear 186 meshes with ring gear 184 and drives gear 188 through shaft 190. Gear 188 meshes with gear 192 and drives pulley 194 which has belt 196 in frictional driving engagement therewith. Belt 196 is fastened to bracket 20 and passes over pulley 198 to complete an endless loop. The electrical circuit is exactly the same as previously described.

The operation of this embodiment is the same as that of the embodiment previously described except the motion of head carrying bracket 20 relative to discs 50. When a selector switch (CW or CCW) (Figure 8) is closed motor 90 rotates and drives gear wheel 98 in the selected direction. Ring gear 184 driving through the gear train drives pulley 194, and the head-carrying bracket moves in the selected direction through the aligned cut-away portions or segments of the discs until the selected contactor 110 rides off the metallic strip as previously described and the driving motor stops. The energization of solenoid 28 and the initiation of the disc's rotation has been previously described.

Figure 11 illustrates a modification of the preferred form of recording head. Gears 70 and 74 are driven by a motor (not shown) and respectively drive soft rubber rollers 72 and 78 to engage and rotate a disc 50, idler rollers 80 and 82 align and guide the disc. The disc 50 is of a suitable transparent or translucent material such as celluloid which will transmit light and has sufficient structural strength to maintain its form under the small stresses imposed thereon by the initiating and rotation cycle. The intelligence is recorded thereon by coded opaque spots or areas. A light source 200 and a photoelectric cell 202 of well known construction are shown mounted on opposed sides of the disc. It will be understood by those versed in the art that when the opaque areas pass between the source of light and the photoelectric cell a pulse is initiated which can be suitably amplified for use in electronic computers or the like. It will be further understood that the disc 50 can be made of an opaque material and the intelligence stored thereon in the form of holes or punched out coded areas. Light sensitive material may be used and a light source responsive to intelligence may be used to record coded impulses thereon.

Figure 12 illustrates a still further modification of the recording and reproducing heads in which the disc 50 is engravable and readable by styluses 210 in accordance with or in response to coded intelligence in the well understood commercial practice.

The machines described in the above specification illustrate only a few of the many possible embodiments of my invention. The movements of the recording heads from disc to disc can be controlled in many ways. Servomechanisms of many types operated by many forms of electrical signals may be employed. The precision required of the positioning servo would be far less, for instance, than that obtained in a servomechanism that positions a gun turret on a battleship. In one of the models of this device, the kicker arm 32 (Figure 1) is provided with an indexing commutator by means of which the servomechanism is at all times cognizant of the position of the heads. Mechanical indexing steps may also be used. These can be similar to those used with typewriter carriages for margin control.

Other forms of recording head assemblies than those shown can be used. Two of the possible versions include staggered heads in order to provide more closely spaced recording channels on the records and several assemblies of heads located about the central shaft so as to decrease access time. As an example, with one assembly of heads the shaft carrying them may have to rotate 360° when going from one record to another. By using 4 sets of heads, mounted at 90° to each other, the search distance can be made to be always less than 90°.

For the sake of clarity, the drawings of this specification show the discs as separated by appreciable distances. In the actual machine the discs are quite close together so the number used in this machine is very large. The discs as actually used are of dural .006 inch thick and 20 inches in diameter. The discs are quite flexible so that exact alignment between them and the recording heads is not necessary.

It will be obvious that instead of making the discs substantially circular with only a small notch cut out of each, it is possible to make recording machines where the discs are reduced to mere sectors. Instead of the motion of the discs being unidirectional, an oscillating type of motion may be employed so that each disc or sector is moved past the recording heads and then swung back to its initial position. This type of operation, while wasteful in time, may result in certain simplifications of the disc driving mechanism. If oscillating motion is used the discs need not be disconnected from their drivers at any time as is the case now with machines illustrated in this specification.

Although the invention has been described by connection with the specific details of the preferred embodiments thereof, it must be understood that such details are not intended to be limitative of the invention, except insofar as set forth in the accompanying claims.

I claim:

1. In a recording and reproducing device, in combination, first means for rotatably supporting a plurality of discs, second means movable in a plane at right angles to the planes of said discs and within the periphery thereof and cooperating with said discs to record information thereon and reproduce information therefrom, indexing means to move said second means to a selected disc, means cooperating with said selected disc to rotate said disc, each of said discs having a segment removed to form a passage for said second means and means for normally rotationally aligning all said discs to form said passage so as not to interfere with said motion of said second means.

2. The combination of claim 1 wherein the said first means is an annulus whereby the said discs are arranged as a toroid.

3. The combination of claim 1 wherein the said first means is an annulus whereby the said discs are arranged in a first circle and said second means moves in a second circle concentric with and of smaller radius than said first circle.

4. The combination of claim 1 wherein the said first means comprises a straight member whereby the said discs are arranged in parallel juxtapositioned relationship.

5. The combination of claim 1 wherein said indexing means comprises a motor driven circular insulating plate member, conductive strip secured to the outer periphery thereof, said strip being broken in at least one point and sliding contactors cooperating with said strip.

6. A device for translating and storing information comprising a plurality of adjacent record sheets capable of storing information in discrete loci thereof, each sheet being in the form of a sector of a surface of revolution mounted on its axis of revolution for rotation thereabout, discrete arcuate information record areas on each sheet in the shape of a plurality of narrow concentric arcs of revolution, a translating head for interconverting information in the form of electric signals and records on said sheets upon rotation of any of said sheets past said translating head, means for selectively positioning said translating head adjacent the ends of any of the discrete information areas of a selected sheet, means for rotating said sheet and its information areas past said translating head for translating information between said head and said sheet, means for moving the translating head in a predetermined path within the periphery of the said sheet from said selected sheet to another selected sheet, and means for normally rotationally aligning all said record sheets to form said predetermined path so as not to interfere with said motion of the translating head.

7. In a recording and reproducing device a plurality of discs supported in spaced relation to rotate on a common axis, recording and reproducing means movable within the periphery of the said discs, means for moving said recording and reproducing means to a selected disc, means cooperating with said selected disc to rotate the same, each of said discs having a segment removed to form a passage for said recording and reproducing means and means for normally rotationally aligning all said discs to form said passage so as not to interfere with said motion of said recording and reproducing means.

8. The invention according to claim 7 wherein the said discs comprise relatively thin plate members mounted on concentric hubs.

9. In a recording and reproducing device in combination, a plurality of discs supported in spaced relation to rotate on a common axis, recording and reproducing means continuously movable within the periphery of the said discs and in a plane at right angles thereto, indexing means to move said recording and reproducing means to a preselected disc, means cooperating with said preselected disc to rotate the same, each of the said discs having a segment removed to form a passage for the said recording and reproducing means and means for rotationally aligning said plurality of discs to form said passage so as not to interfere with said motion of said recording and reproducing means.

10. The invention according to claim 9 in which the said discs are arranged in a circle and the said recording and reproducing means moves in a second circle concentric with and of smaller radius than the first circle.

11. The invention according to claim 9 wherein the said discs are arranged in parallel juxtapositioned relationship.

References Cited in the file of this patent

UNITED STATES PATENTS

| Number | Name | Date |
|---|---|---|
| 702,985 | Moore | June 24, 1902 |
| 1,454,134 | Nyquist | May 8, 1923 |
| 2,175,142 | Andres | Oct. 3, 1939 |
| 2,235,301 | Robinson | Mar. 18, 1941 |
| 2,362,918 | Miller | Nov. 14, 1944 |
| 2,457,668 | Hart | Dec. 28, 1948 |

FOREIGN PATENTS

| Number | Country | Date |
|---|---|---|
| 598,584 | Germany | June 15, 1934 |